United States Patent
Ross

(10) Patent No.: US 9,407,583 B2
(45) Date of Patent: Aug. 2, 2016

(54) HANDLING UNAVAILABLE DESTINATIONS IN A MESSAGING NETWORK

(71) Applicant: Red Hat, Inc., Raleigh, NC (US)

(72) Inventor: Theodore Langston Ross, Littleton, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/839,371

(22) Filed: Mar. 15, 2013

(65) Prior Publication Data

US 2014/0280628 A1  Sep. 18, 2014

(51) Int. Cl.
*G06F 15/16* (2006.01)
*H04L 12/58* (2006.01)
*H04L 12/721* (2013.01)

(52) U.S. Cl.
CPC .............. *H04L 51/04* (2013.01); *H04L 45/12* (2013.01)

(58) Field of Classification Search
USPC .......................... 709/206, 230, 224, 239, 229
See application file for complete search history.

(56) References Cited

U.S. PATENT DOCUMENTS

| | | | |
|---|---|---|---|
| 6,980,548 B1 | 12/2005 | Zaccone et al. | |
| 7,319,700 B1 | 1/2008 | Kompella | |
| 7,573,888 B2 | 8/2009 | Previdi et al. | |
| 7,676,598 B2 | 3/2010 | Bosscha et al. | |
| 7,774,597 B2 | 8/2010 | Narayanan | |
| 8,018,873 B1 | 9/2011 | Kompella | |
| 8,495,160 B2 * | 7/2013 | Fletcher et al. | 709/207 |
| 8,520,673 B2 | 8/2013 | Chen et al. | |
| 8,725,814 B2 * | 5/2014 | Bhogal | H04L 67/2809 709/206 |
| 9,112,824 B2 | 8/2015 | Ross et al. | |
| 2003/0037102 A1 * | 2/2003 | Eckert et al. | 709/203 |
| 2003/0115317 A1 * | 6/2003 | Hickson et al. | 709/224 |
| 2003/0135556 A1 * | 7/2003 | Holdsworth | 709/206 |
| 2003/0177412 A1 * | 9/2003 | Todd | 714/25 |
| 2005/0021622 A1 * | 1/2005 | Cullen | G06Q 30/02 709/204 |
| 2006/0056628 A1 * | 3/2006 | Todd | 380/233 |
| 2006/0074876 A1 * | 4/2006 | Kakivaya et al. | 707/3 |
| 2006/0184683 A1 | 8/2006 | Bosscha et al. | |
| 2008/0095163 A1 | 4/2008 | Chen et al. | |
| 2009/0252033 A1 | 10/2009 | Ramakrishnan et al. | |

(Continued)

OTHER PUBLICATIONS

Co-pending U.S. Appl. No. 13/777,874, filed Feb. 26, 2013.

(Continued)

*Primary Examiner* — Jude Jean Gilles
(74) *Attorney, Agent, or Firm* — Lowenstein Sandler LLP

(57) ABSTRACT

The subject matter of this specification can be implemented in, among other things, a method that includes establishing first federation links between a message broker system and neighbors of the message broker system. The method further includes distributing information describing the first federation links to other message broker systems. The method further includes receiving information describing second federation links between each of the other message broker systems and neighbors of each of the other message broker system. The method further includes identifying shortest paths between the message broker system and each of the other message broker systems. The method further includes receiving a request to send a message from a source message broker system to a destination message broker system. The method further includes determining that none of the shortest paths to the destination message broker system are available and, in response, taking corrective action.

18 Claims, 4 Drawing Sheets

(56) References Cited

U.S. PATENT DOCUMENTS

| | | | |
|---|---|---|---|
| 2011/0307789 A1* | 12/2011 | Karenos et al. | 715/735 |
| 2012/0207159 A1 | 8/2012 | Buchko et al. | |
| 2012/0215832 A1* | 8/2012 | Bhogal | G06F 9/542 709/203 |
| 2012/0246219 A1* | 9/2012 | Bhogal | H04L 67/2809 709/203 |
| 2013/0060834 A1* | 3/2013 | Paramasivam | H04L 12/66 709/202 |
| 2013/0124767 A1* | 5/2013 | Prasadh | G06F 13/37 710/111 |
| 2013/0279397 A1 | 10/2013 | Hui et al. | |
| 2013/0315099 A1 | 11/2013 | Chen et al. | |
| 2014/0003228 A1 | 1/2014 | Shah et al. | |
| 2014/0108523 A1* | 4/2014 | Paramasivam et al. | 709/204 |
| 2014/0244746 A1 | 8/2014 | Ross et al. | |
| 2014/0280627 A1 | 9/2014 | Ross | |
| 2014/0280628 A1* | 9/2014 | Ross | 709/206 |

OTHER PUBLICATIONS

Co-pending U.S. Appl. No. 13/839,109, filed Mar. 15, 2013.

Clausen, et al. "Optimized Link State Routing Protocol (OLSR)", Request for Comments: 3626 by Network Working Group, http://www.ietf.org/rfc/rfc3626.txt, Oct. 2003, pp. 1-71.

Moy, J. "OSFP Version 2", Request for Comments: 2328 by Network Working Group, http://www.ietf.org/rfc/rfc2328.txt, Apr. 1998, pp. 1-204.

USPTO; Office Action for U.S. Appl. No. 13/777,874, mailed Nov. 4, 2014.

USPTO; Notice of Allowance for U.S. Appl. No. 13/839,109, mailed Jan. 13, 2015.

USPTO; Office Action for U.S. Appl. No. 13/777,874, mailed Apr. 22, 2015.

USPTO; Notice of Allowance for U.S. Appl. No. 13/839,109, mailed Apr. 13, 2015.

USPTO; Office Action for U.S. Appl. No. 13/777,874, mailed Dec. 10, 2015.

* cited by examiner

HANDLING UNAVAILABLE DESTINATIONS IN A MESSAGING NETWORK

TECHNICAL FIELD

This instant specification relates to handling messages for destinations in a messaging network that are temporarily unavailable.

BACKGROUND

A message bus is a messaging system that allows organizations to send semantically precise messages between a sender computing system and a receiver computing system. The message bus generally uses a particular structure and/or format for the messages. For example, messages may use Extensible Markup Language (XML) or JavaScript Object Notation (JSON) with a protocol, such as Data Distribution Service (DDS) or Advanced Message Queuing Protocol (AMQP). The message bus typically handles routing of messages between the sender computing system and the receiver computing system. The computing systems may also federate so that intermediate computing systems in the message bus between the sender and the receiver may assist in the routing of messages.

DETAILED DESCRIPTION

Figure 1A:
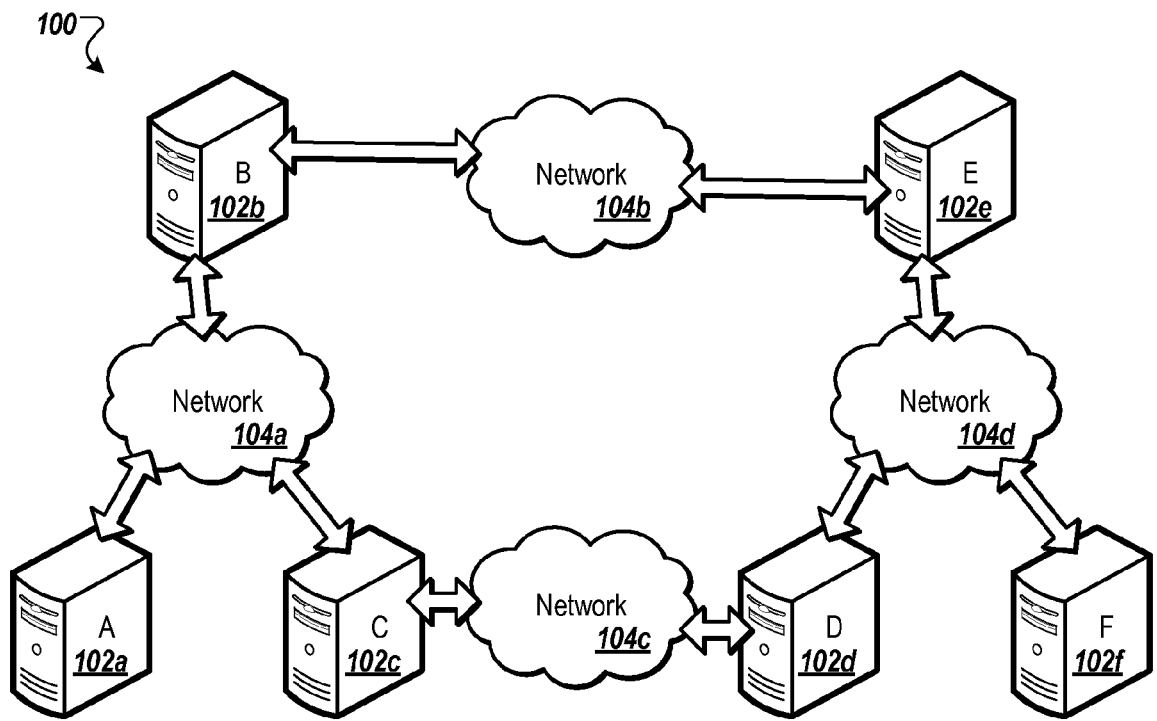
FIG. 1A is a schematic diagram that shows an example of a system for handling messages for destinations in a messaging network that are temporarily unavailable.

This document describes systems and techniques for handling messages for destinations in a messaging network that are temporarily unavailable. Based on link-state information for message broker systems in a message bus, a message broker system may determine that a destination message broker system for a message is not available. The message broker system may then take corrective action to handle the temporarily unavailable destination message broker system, such as by queuing the message at the message broker system or by sending the message to a next message broker system along a path to the destination message broker system. The message broker system may take the corrective action based on a determination that the destination message broker system is scheduled to become available at some point in the future.

The systems and techniques described here may provide one or more advantages, such as by allowing self-healing routing through a redundant broker topology. In addition, the systems and techniques may provide ease of deployment where adding a new broker to the message bus includes turning the broker on and creating federation links to neighbors of the broker without configuring the new broker at brokers other than the neighbors.

A large-scale messaging bus may have one or more of the following attributes. The message bus may have local access points for clients. For example, applications that use the messaging bus for system-to-system communication may not have network access (e.g., Internet access or wide area network access) directly to all of the other message brokers in the network with which the application attempts to communicate. An application may make a connection to a local message broker system in the message bus and rely on that local message broker system to route messages to the other message broker systems.

The message bus may have a network topology with redundant paths between the message broker systems in the message bus. The redundant paths may provide for reliability of message delivery in the message bus. The redundant network topology may allow recovery from a failure of a component or link between components by using a different path to the destination message broker systems.

The message bus may use link-state information to provide ease of deployment. The message bus may have relatively frequent changes to the configuration of the message bus, such as by having message broker systems added to and/or removed from the message bus, and/or having federation links between message broker systems added and/or removed. For example, new networks and message broker systems may be added to meet the needs of applications that use the message bus. Sharing link-state information that describes federation links between a message broker system and its neighbors with other message broker systems may reduce the amount of configuration needed at the other message broker systems.

The sharing of link-state information provides a distributed way to determine optimal and/or shortest paths across the redundant topology. In addition, the sharing of link-state information may provide for automatic and efficient adaptation to changes in the topology, such as failures of components and interconnections.

FIG. 1A is a schematic diagram that shows an example of a messaging system 100 for handling messages for destinations in a messaging network that are temporarily unavailable. The messaging system 100 includes multiple message broker systems 102a-f in communication with one another over multiple networks 104a-d. The message broker systems 102a-f federate with one another to form a message bus. For example, the first message broker system 102a may establish federation links with the second message broker system 102b and the third message broker system 102c over the first network 104a. The second message broker system 102b is also in communication with the fifth message broker system 102e over the second network 104b. As a result, the second message broker system 102b may establish a federation link with the fifth message broker system 102e over the second network 104b. Correspondingly, the third message broker system 102c may establish a federation link with the fourth message broker system 102d over the third network 104c, and the message broker systems 102d-f on the fourth network may establish federation links with one another.

Federation links allow a message broker system to send messages to and/or receive messages from neighbors of the message broker system in a messaging network. The message broker system may send messages to and/or receive messages from another message broker system that is not a neighbor of the message broker system as long as a chain of federation links connects the message broker system to the other message broker system. Each of the message broker systems 102a-f may be hosted by a separate computer system such as a server computing system, a desktop computing device, a mobile computing device, or other computing device or system. Alternatively, at least some of the message broker systems 102a-f may be part of virtual machines hosted by the same or different computing systems. The network 104 may include, for example, a local network, a wide network, and/or one or more of the computing devices that form the Internet. An example of message broker system 102 will be discussed in more detail below in conjunction with FIG. 2.

Figure 1B:
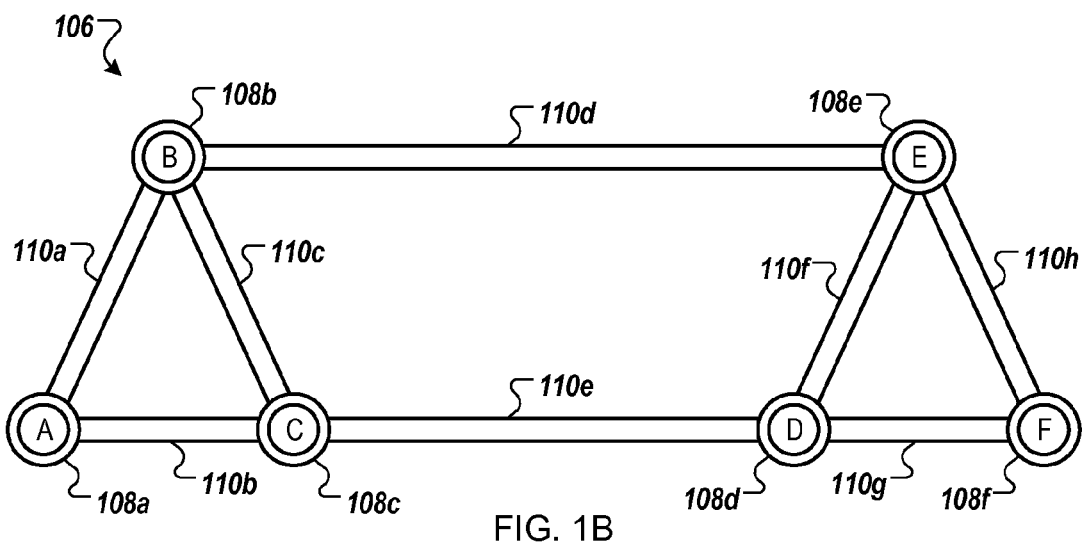
FIG. 1B is a diagram that shows an example of a model of a system for handling messages for destinations in a messaging network that are temporarily unavailable.

FIG. 1B is a diagram that shows an example of a model 106 of the messaging system 100 for handling messages for destinations in a messaging network that are temporarily unavailable. The model 106 includes multiple nodes 108a-f that correspond to the message broker systems 102a-f. The nodes 108a-f are joined by multiple edges 110a-h that represent the federation links between the message broker system 102a-f.

The message broker systems 102a-f and the federation links between them form a message bus. The message bus allows messages to be sent from one message broker system to another message broker system even though the two message broker systems may not have access to the same network. For example, the first message broker system 102a may send a message to the sixth message broker system 102f. The first message broker system 102a has multiple paths to the sixth message broker system 102f, such as the path from the first node 108a through the second node 108b and the fifth node 108e to the sixth node 108f, or the path from the first node 108a through the third node 108c and the fourth node 108d to the sixth node 108f.

Each of the message broker systems 102a-f uses the federation links to identify shortest paths to each of the other ones of the message broker systems 102a-f. The message broker systems 102a-f may each store the corresponding set of shortest paths. When a change occurs to a state of a federation link in the model 106, such as when a network connection or a message broker system is unavailable, each of the message broker systems 102a-f updates its corresponding set of shortest paths to the others of the message broker systems 102a-f. In some implementations, the message broker systems 102a-f retain information that describes previously available federation links while the federation links are unavailable. For example, the link-state information may identify federation links that were available at some previous time, but are currently unavailable.

Figure 2:
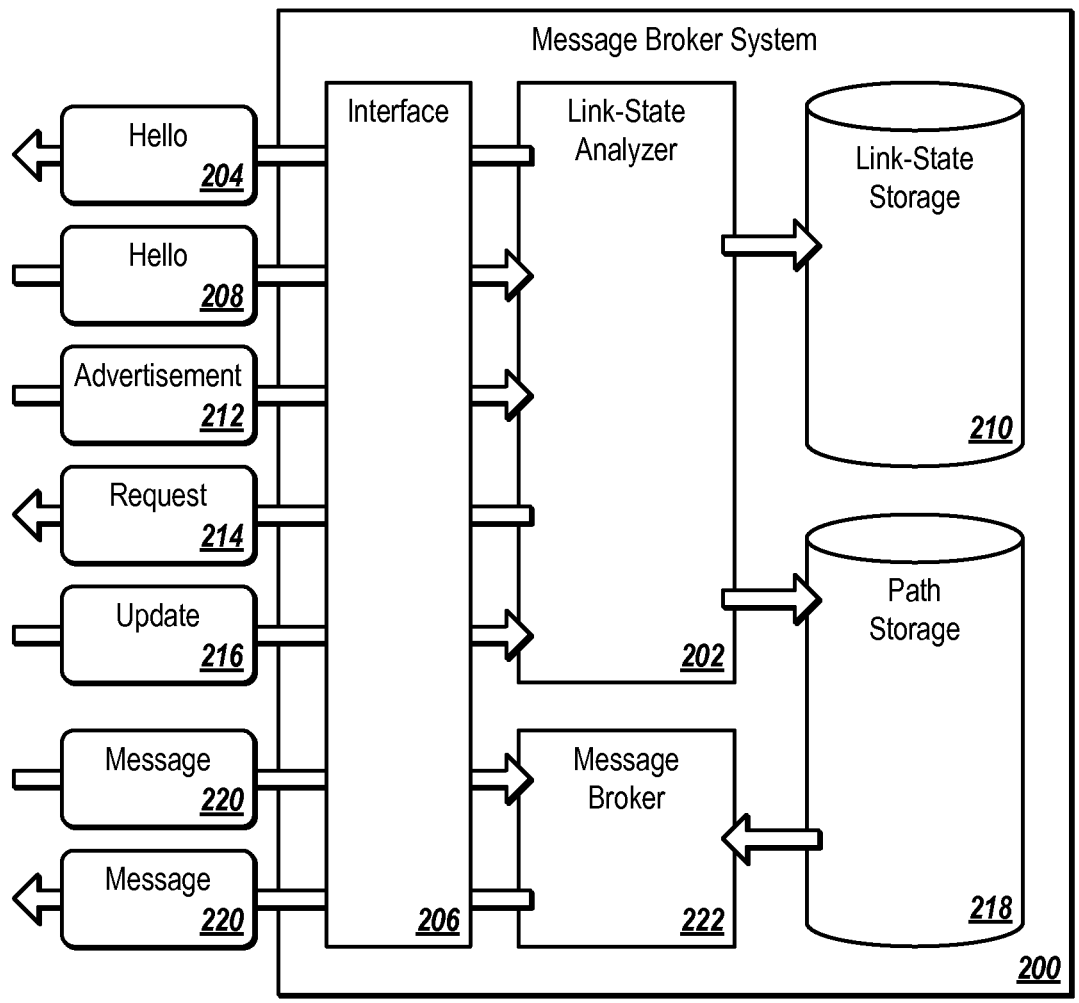
FIG. 2 is a block diagram that shows an example of a message broker system for analyzing federation link-states in a message bus and handling messages for destinations in a messaging network that are temporarily unavailable.

FIG. 2 is a block diagram that shows an example of a message broker system 200 for analyzing federation link-states in a message bus and handling messages for destinations in a messaging network that are temporarily unavailable. The message broker system 200 can, for example, be included in one or more of the message broker systems 102a-f shown in FIG. 1A. The message broker system 200 includes a link-state analyzer 202 that establishes and analyzes the federation links between message broker systems in the message bus.

For example, the first message broker system 102a may use the link-state analyzer 202 to establish federation links with the message broker systems 102b-c on the first network 104a that are neighbors of the first message broker system 102a in the message bus. The link-state analyzer 202 then periodically broadcasts a link-state (LS) hello 204 through an interface 206 to the message broker systems 102b-c on the first network 104a. The link-state hello 204 includes a list of the message broker systems from which the first message broker system 102a has previously received a link-state hello. When the first message broker system 102a receives a link-state hello 208 from another message broker system with a list of message broker systems that includes the first message broker system 102a, then the first message broker system 102a adds the other message broker system to the list of available neighboring message broker systems. The message broker system 200 stores the list of available neighboring message broker systems in a link-state storage 210.

The message broker system 200 broadcasts a link-state advertisement to the neighboring message broker systems in the message bus. The neighboring message broker systems forward the link-state advertisement to other message broker systems in the message bus that are not neighbors of the message broker system 200. The link-state advertisement includes a brief summary of the states of the federation links for the message broker system 200. For example, the brief summary may include a version identifier (ID), a sequence number, and/or a timestamp. The link-state analyzer 202 may update the brief summary each time a change is made to the states of the federation links between the message broker system 200 and the neighbors of the message broker system 200. The version identifier, sequence number, and/or timestamp may be updated according to a predictable pattern, such as by incrementing the sequence or setting the timestamp to the current time. The predictable pattern may allow other message broker systems to compare a stored brief summary for a previously received link-state advertisement to the brief summary from the current link-state advertisement to determine if the current link-state advertisement is associated with newer federation link information than the previously received link-state advertisement.

The message broker system 200 may also receive a link-state advertisement 212 from another message broker system. The link-state analyzer 202 may compare a brief summary in the link-state advertisement 212 to a stored brief summary, if any, of a previously received link-state advertisement from the other message broker system. The message broker system 200 may store the brief summaries of link-state advertisements for message broker systems in the link-state storage 210. If the comparison indicates that the other message broker system has newer federation link information than the federation link information that was associated with the previous link-state advertisement, then the link-state analyzer 202 sends a link-state request 214 to the other message broker system for the newer federation link information.

In response to the link-state request 214, the message broker system 200 receives a link-state update 216 from the other message broker system to the federation link information for the other message broker system. The message broker system 200 stores the updated federation link information in the link-state storage 210. In addition, the link-state analyzer 202 identifies the shortest paths between the message broker system 200 and each of the other message broker systems. The message broker system 200 stores the shortest paths in a path storage 218. The shortest paths may include currently available paths as well as previously available paths.

The message broker system 200 may then receive a request to send a message 220 from a source message broker system in the message bus to a destination message broker system in the message bus. In some implementations, the request includes a unique name or identifier, such as a text string, as an address for delivery of a message to a particular message broker system in the message bus. The request may also include a unique name or identifier of the source message broker system that originally sent the message 220.

The message broker system 200 includes a message broker 222. The message broker 222 uses the name/ID of the destination message broker system to retrieve one or more shortest paths between the message broker system 200 and the destination message broker system from the path storage 218. The message broker 222 may determine that the shortest paths to the destination are currently unavailable. The unavailable states of the shortest paths may be a result of the link-state update 216. In response to the determination that the shortest paths are currently unavailable, the message broker 222 takes corrective action to handle the unavailable shortest paths.

As part of the corrective action, for example, the message broker 222 may queue the message 220 at the message broker system 200 until at least one of the shortest paths to the destination message broker system becomes available. The message broker 222 may then deliver the message 220 to the destination message broker system. The message broker 222 may queue the message 220 for a particular amount of time. If the destination message broker system does not become available with that time, then the message broker 222 may end the delivery of the message 220. The message broker 222 may notify the source message broker system that the message 220 could not be delivered. In another example, the message broker 222 may identify a next message broker system that is currently available along one of the shortest paths to the destination message broker system. The message broker 222 then delivers the message 220 to the next message broker system.

The message broker 222 may base the correction action on a determination that the destination message broker system is scheduled to become available. For example, the destination message broker system may have a predictable pattern of unavailability due to transit of satellites that provide a satellite data connection to a message broker system in the path between the message broker system 200 and the destination message broker system. In another example, transit of the destination message broker system (or an intermediate message broker system between the message broker system 200 and the destination message broker system) within a terrestrial mobile data network may result in a predictable pattern of unavailability. In response to determining that the destination message broker system is scheduled to become available, the message broker 222 may queue the message 220 and/or deliver the message 220 the next message broker system.

The message broker system 200 includes at least one computing device. One or more of the components of the message broker system 200 (e.g., the link-state analyzer 202, the message broker 222, the link-state storage 210, and the path storage 218) may be implemented at a same computing device or separate computing devices within the message broker system 200. Furthermore, one or more of the components of the message broker system 200 may be implemented within a virtual server in operation at a computing device. In some implementations, the message broker system 200 and other message broker systems in the message bus implement the link-state analysis as an extension of an existing messaging protocol, such as an extension of the Advanced Message Queuing Protocol (e.g., version 1.0).

Figure 3:
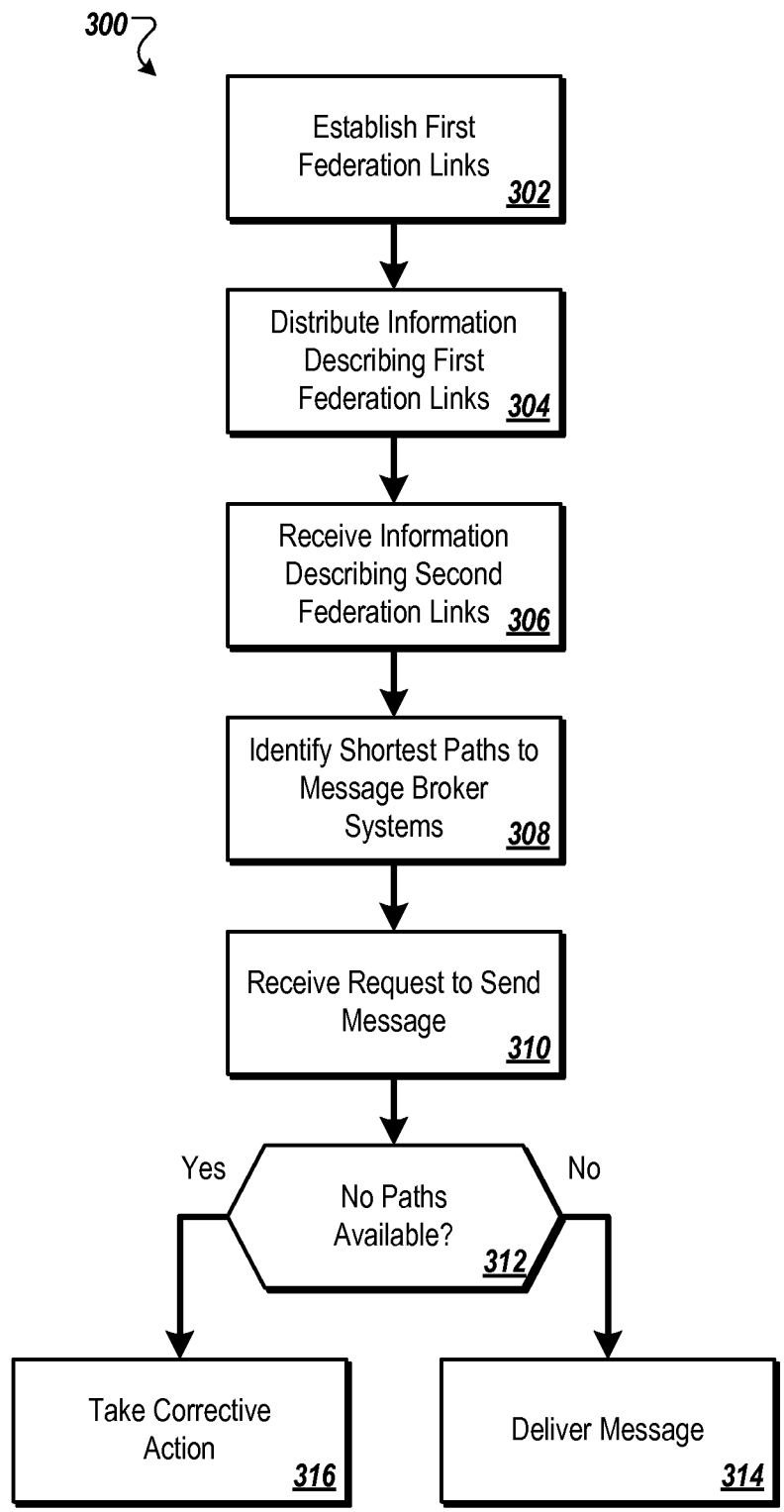
FIG. 3 is a flow chart that shows an example of a process for handling messages for destinations in a messaging network that are temporarily unavailable.

FIG. 3 is a flow chart that shows an example of a process 300 for handling messages for destinations in a messaging network that are temporarily unavailable. The process 300 may be performed, for example, by a system such as the messaging system 100 and the message broker system 200. For clarity of presentation, the description that follows uses the messaging system 100 and the message broker system 200 as examples for describing the process 300. However, another system, or combination of systems, may be used to perform the process 300.

The process 300 begins, at block 302, with establishing, at a message broker system among multiple message broker systems in a message bus, first federation links between the message broker system and ones of the message broker systems that neighbor the message broker system. Neighbors may include message broker systems that the message broker system may directly access over a network without relying on an intermediate message broker system between the message broker system and the neighbors to provide the access. For example, the first message broker system 102a may establish the messaging federation links with the neighbors on the first network 104a including the second message broker system 102b and the third message broker system 102c.

At block 304, the process 300 includes distributing, from the message broker system, information describing the first federation links to others of the message broker systems. For example, the link-state analyzer 202 may broadcast the link-state hello 204 to its neighbors to confirm that a connection is available to each of the neighbors. The link-state hello 204 may include a list of the neighbors from which the message broker system 200 has received a link-state hello that lists the message broker system 200.

The link-state analyzer 202 then broadcasts a link-state advertisement to its neighbors who forward the link-state advertisement to their other neighbors. The forwarding is repeated by each of the subsequent neighbors. When a subsequent message broker system receives a link-state advertisement indicating that the message broker system 200 has newer link-state information, then the subsequent message broker system sends a link-state request to the message broker system 200 and, in response, the link-state analyzer 202 sends a link-state update that includes the newer link-state information.

At block 306, the process 300 includes receiving, at the message broker system, information describing second federation links between each of the others of the message broker systems and ones of the others of the message broker systems that neighbor each of the others of the message broker systems. For example, the link-state analyzer 202 may receive the link-state advertisement 212 indicating that another message broker system has newer link-state information that the message broker system 200 currently has for that other message broker system. In response to the determination that newer link-state information exists at the other message broker system, the link-state analyzer 202 sends the link-state request 214 to the other message broker system. In response to the link-state request 214, the link-state analyzer 202 receives the link-state update 216 from the other message broker system and stores the link-state information from the link-state update 216 in the link-state storage 210. The link-state analyzer 202 may repeat this process for the other message broker systems.

At block 308, the process 300 includes identifying shortest paths through the message bus between the message broker system and each of the others of the message broker systems based on the first federation links and the second federation links. For example, the link-state analyzer 202 may analyze the link-state information in the link-state storage 210 for each of the other message broker systems to identify the shortest paths between the message broker system 200 and each of the other message broker systems. The link-state analyzer 202 uses the link-state information to generate a model, such as the model 106, that represents the other message broker systems and the federation links between the message broker systems in the message bus. The link-state analyzer 202 may then use the model to identify the shortest paths between the message broker system 200 and each of the other message broker systems, such as by performing a form of Dijkstra's algorithm for calculating shortest paths. Forms of Dijkstra's algorithm use a graph search algorithm that solves a single-source shortest path problem for a graph with non-negative edge path costs and produces a shortest path tree.

At block 310, the process 300 includes receiving, at the message broker system from a source message broker system among the message broker systems, a request to send a message from the source message broker system through the message bus to a destination message broker system among the message broker systems. For example, the second message broker system 102b may receive a request from the first message broker system 102a to send a message to the sixth message broker system 102f. The first message broker system 102a send the request through one or more intermediate message broker systems (including the second message broker system 102b), because the first message broker system 102a is not directly federated with the sixth message broker system 102f (e.g., the sixth message broker system 102f is not a neighbor of the first message broker system 102a).

At block 312, the process 300 includes determining, at the message broker system, if any of the shortest paths to the destination message broker system are available. At block 314, if there is a path available, then the process 300 includes delivering the message to the destination message broker system along the path, e.g., by delivering the message to a next message broker system along the path to the destination message broker system. Otherwise, at block 316, if there are no paths available to the destination message broker system, then the process 300 includes taking, at the message broker system, corrective action based on determining that none of the shortest paths to the destination message broker system are available. For example, the second message broker system 102b may determine that there are no available paths among the shortest paths between the second message broker system 102b and the sixth message broker system 102f and, as a result, the second message broker system 102b takes corrective action for the message.

Taking corrective action may include queuing the message at the message broker system in response to determining that none of the shortest paths to the destination message broker system are available. The process 300 may then include determining, at the message broker system, that one of the shortest paths to the destination message broker system has become available and then delivering the queued message to the destination message broker system in response to determining that the one of the shortest paths to the destination message broker system has become available. For example, the second message broker system 102b may queue a message from the first message broker system 102a to be delivered to the sixth message broker system 102f in response to determining that the paths to the sixth message broker system 102f are unavailable (e.g., the sixth message broker system 102f may not be functioning properly and/or the fourth network 104d may not be functioning properly). Upon determining that a path to the sixth message broker system 102f has become available, the second message broker system 102b may deliver the queued message to the sixth message broker system 102f.

In some implementations, the process 300 may include determining that the one of the shortest paths to the destination message broker system is scheduled to be available, and queuing the message may be further in response to determining that the one of the shortest paths to the destination message broker system is scheduled to be available. In some implementations, queuing the message may include queuing the message for a predetermined amount of time. For example, after the predetermined amount of time the second message broker system 102b may terminate delivery of the queued message and may notify the first message broker system 102a that the message was not delivered.

Taking corrective action may also include identifying, at the message broker system, a next message broker system that is available along one of the shortest paths to the destination message broker system. The process 300 may then include delivering the message to the next message broker system in response to identifying the next message broker system. For example, the second message broker system 102b may determine that the fifth message broker system 102e is available and, in response, delivers the message to the fifth message broker system 102e even though the ultimate destination, the sixth message broker system 102f, is unavailable. Subsequently, the fifth message broker system 102e may then queue the message if the sixth message broker system 102f remains unavailable.

In some implementations, the process 300 may include determining that the one of the shortest paths to the destination message broker system is scheduled to be available. Identifying the next message broker system and delivering the message to the next message broker system may then occur in response to determining that the one of the shortest paths to the destination message broker system is scheduled to be available.

One or more of the steps in the process 300 may be performed in parallel or in a different order than the order described above. For example, the process 300 may receive the request to send the message concurrently with distributing the first federation links, receiving the second federation links, and/or identifying the shortest paths. In another example, the request to send the message to the destination message broker system may be received at another time, such as after establishing the first federation links, but before distributing the first federation links, receiving the second federation links, and/or identifying the shortest paths.

One or more of the steps in the process 300 may be repeated. For example, one or more the steps of establishing the first federation links, distributing the first federation links, receiving the second federation links, and/or identifying the shortest paths may be repeated, such as during the time that the corrective action occurs. In addition, another request to send a message may be received. The subsequent request may be received during the time that the corrective action for the original request to send a message occurs.

Figure 4:
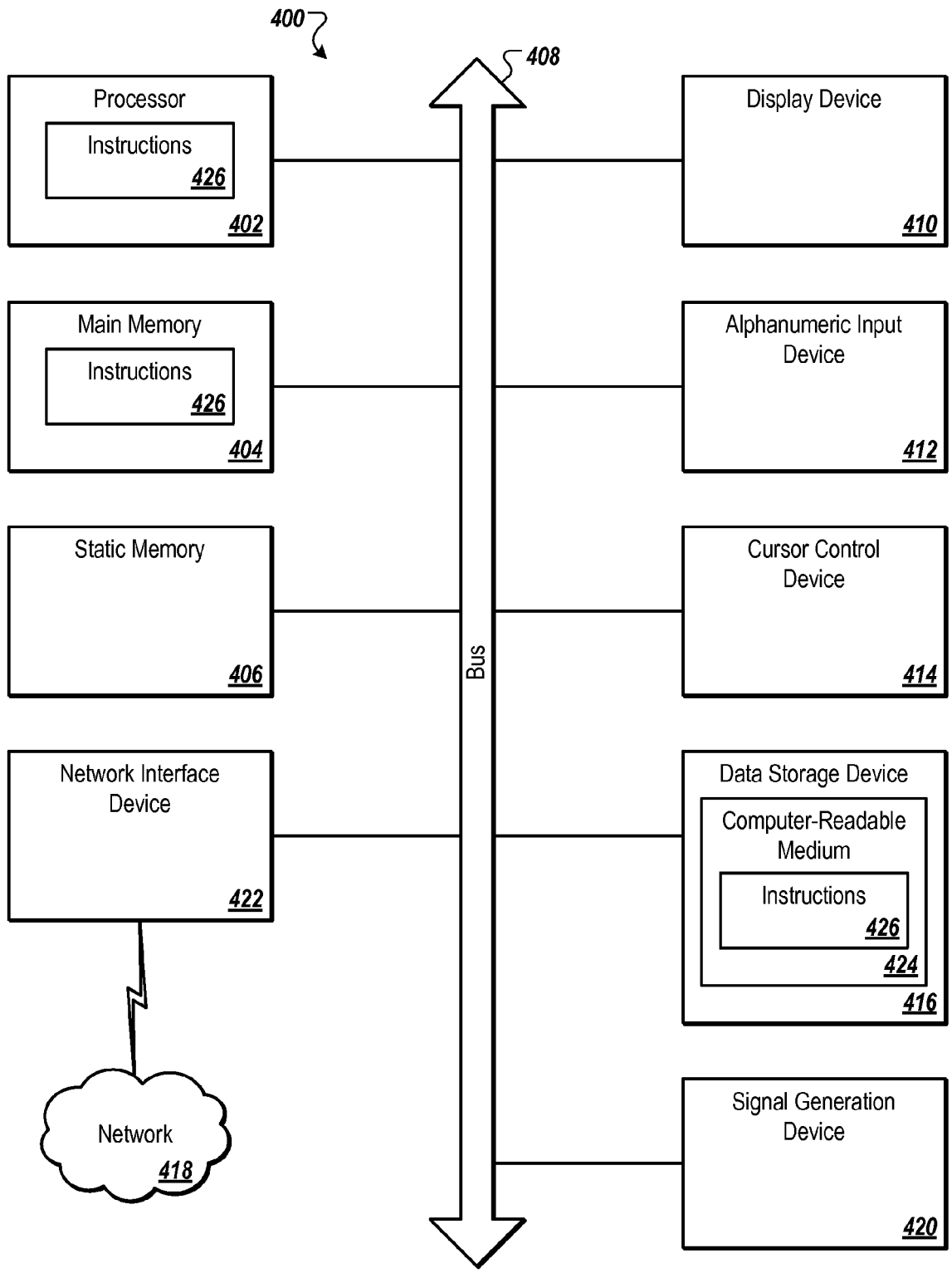
FIG. 4 is a schematic diagram that shows an example of a computing system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the message broker system 200 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the message broker system 200 embodying any one or more of the methodologies or functions described herein. The sets of instructions 426 of the message broker system 200 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

identifying, by a processor of a message broker system among multiple message broker systems in a message bus, shortest paths through the message bus between the message broker system and others of the message broker systems in view of first federation links between the message broker system and ones of the other of the message broker systems that neighbor the message broker system and in view of second federation links between each of the others of the message broker systems and ones of the message broker systems that neighbor each of the others of the message broker systems;

receiving, at the message broker system, a request to send a message from a source message broker system among the message broker systems through the message bus to a destination message broker system among the message broker systems;

determining, by the processor of the message broker system, that none of the shortest paths to the destination message broker system are available; and initiating, by the processor of the message broker system, corrective action in view of determining that none of the shortest paths to the destination message broker system are available.

2. The method of claim 1, wherein initiating the corrective action comprises:

queuing the message at the message broker system in response to determining that none of the shortest paths to the destination message broker system are available;

determining that one of the shortest paths to the destination message broker system has become available; and delivering the queued message to the destination message broker system in response to determining that the one of the shortest paths to the destination message broker system has become available.

3. The method of claim 2, wherein initiating the corrective action comprises determining that the one of the shortest paths to the destination message broker system is scheduled to be available, and wherein queuing the message is further in response to determining that the one of the shortest paths to the destination message broker system is scheduled to be available.

4. The method of claim 2, wherein queuing the message comprises queuing the message for a predetermined amount of time.

5. The method of claim 1, wherein initiating the corrective action comprises:

identifying a next message broker system that is available along one of the shortest paths to the destination message broker system; and delivering the message to the next message broker system in response to identifying the next message broker system.

6. The method of claim 5, wherein initiating the corrective action comprises determining that the one of the shortest paths to the destination message broker system is scheduled to be available, and wherein identifying the next message broker system is in response to determining that the one of the shortest paths to the destination message broker system is scheduled to be available.

7. A non-transitory computer-readable medium having instructions stored thereon that, when executed by a processor, cause the processor to:

identify, by the processor of a message broker system among multiple message broker systems in a message bus, shortest paths through the message bus between the message broker system and others of the message broker systems in view of first federation links between the message broker system and ones of the others of the message broker systems that neighbor the message broker system and in view of second federation links between each of the others of the message broker systems and ones of the message broker systems that neighbor each of the others of the message broker systems;

receive, at the message broker system, a request to send a message from a source message broker system among the message broker systems through the message bus to a destination message broker system among the message broker systems;

determine, by the processor of the message broker system, that none of the shortest paths to the destination message broker system are available; and initiate, by the processor of the message broker system, corrective action in view of the determination that none of the shortest paths to the destination message broker system are available.

8. The computer-readable medium of claim 7, wherein, to initiate the corrective action, the processor is further to:

queue the message at the message broker system in response to the determination that none of the shortest paths to the destination message broker system are available;

determine that one of the shortest paths to the destination message broker system has become available; and deliver the queued message to the destination message broker system in response to the determination that the one of the shortest paths to the destination message broker system has become available.

9. The computer-readable medium of claim 8, wherein, to initiate the corrective action, the processor is further to determine that the one of the shortest paths to the destination message broker system is scheduled to be available, and wherein the processor is to queue the message further in response to the determination that the one of the shortest paths to the destination message broker system is scheduled to be available.

10. The computer-readable medium of claim 8, wherein, to queue the message, the processor is to queue the message for a predetermined amount of time.

11. The computer-readable medium of claim 7, wherein, to initiate the corrective action, the processor is further to:

identify, at the message broker system, a next message broker system that is available along one of the shortest paths to the destination message broker system; and deliver the message to the next message broker system in response to the identification of the next message broker system.

12. The computer-readable medium of claim 11, wherein, to initiate the corrective action, the processor is further to determine that the one of the shortest paths to the destination message broker system is scheduled to be available, and wherein the processor is to identify the next message broker system in response to the determination that the one of the shortest paths to the destination message broker system is scheduled to be available.

13. A system comprising:

an interface, of a message broker system among multiple message broker systems in a message bus, to receive a request to send a message from a source message broker system among the message broker systems through the message bus to a destination message broker system among the message broker systems; and a processor, of the message broker system, to identify shortest paths through the message bus between the message broker system and others of the message broker systems in view of first federation links between the message broker system and ones of the others of the message broker systems that neighbor the message broker system and in view of second federation links, between each of the others of the message broker systems and ones of the message broker systems that neighbor each of the others of the message broker systems, to determine that none of the shortest paths to the destination message broker system are available, and to initiate corrective action in view of the determination that none of the shortest paths to the destination message broker system are available.

14. The system of claim 13, wherein, to initiate the corrective action, the processor is further to:
   queue the message at the message broker system in response to the determination that none of the shortest paths to the destination message broker system are available;
   determine that one of the shortest paths to the destination message broker system has become available; and
   deliver the queued message to the destination message broker system in response to the determination that the one of the shortest paths to the destination message broker system has become available.

15. The system of claim 14, wherein, to initiate the corrective action, the processor is further to determine that the one of the shortest paths to the destination message broker system is scheduled to be available, and wherein the processor is to queue the message further in response to the determination that the one of the shortest paths to the destination message broker system is scheduled to be available.

16. The system of claim 14, wherein, to queue the message, the processor is to queue the message for a predetermined amount of time.

17. The system of claim 13, wherein, to initiate the corrective action, the processor is further to:
   identify a next message broker system that is available along one of the shortest paths to the destination message broker system; and
   deliver the message to the next message broker system in response to the identification of the next message broker system.

18. The system of claim 17, wherein, to initiate the corrective action, the processor is further to determine that the one of the shortest paths to the destination message broker system is scheduled to be available, and wherein the processor is to identify the next message broker system in response to the determination that the one of the shortest paths to the destination message broker system is scheduled to be available.

* * * * *